United States Patent
Haeffner et al.

(10) Patent No.: US 7,618,536 B2
(45) Date of Patent: Nov. 17, 2009

(54) METHOD OF TREATING A MARINE OBJECT

(75) Inventors: Mikael Haeffner, Stockholm (SE);
Claes Tarras Ericsson, Saltsjo-Boo (SE)

(73) Assignee: Ekomarine AB, Nacka (SE)

( * ) Notice: Subject to any disclaimer, the term of this patent is extended or adjusted under 35 U.S.C. 154(b) by 19 days.

(21) Appl. No.: 12/106,001

(22) Filed: Apr. 18, 2008

(65) Prior Publication Data

US 2008/0190864 A1   Aug. 14, 2008

Related U.S. Application Data

(63) Continuation-in-part of application No. 11/868,451, filed on Oct. 5, 2007, and a continuation-in-part of application No. 10/526,596, filed on Mar. 4, 2005, now abandoned.

(51) Int. Cl.
*C02F 3/00* (2006.01)
(52) U.S. Cl. .................................... 210/610; 210/242.2
(58) Field of Classification Search .................. 210/610, 210/242.1–242.2
See application file for complete search history.

(56) References Cited

U.S. PATENT DOCUMENTS

| 5,770,188 A | 6/1998 | Hamade et al. |
| 2006/0151386 A1* | 7/2006 | De Blois .................... 210/601 |

FOREIGN PATENT DOCUMENTS

| EP | 0869159 | 10/1998 |
| WO | 0077102 | 12/2000 |
| WO | 0194479 | 12/2001 |

* cited by examiner

*Primary Examiner*—Chester T Barry
(74) *Attorney, Agent, or Firm*—Rolf Fasth; Fasth Law Offices

(57) ABSTRACT

A method for eliminating alien species and undesirable organisms from ballast water of a marine vessel. Ballast water (204) is injected into a container (202). An organic substance is added to the ballast water. Heterotrophic organisms (219) in the ballast water reproduce and consume the organic substance (218). The heterotrophic organisms substantially reduce the oxygen level in the ballast water compared to the oxygen level of untreated ballast water. The alien species and undesirable organisms die due to lack of oxygen.

7 Claims, 3 Drawing Sheets

METHOD OF TREATING A MARINE OBJECT

PRIOR APPLICATION

This is a continuation-in-part application of continuation-in-part application Ser. No. 11/868,451, filed 5 Oct. 2007 that claims priority from U.S. patent application Ser. No. 10/526,596 filed 4 Mar. 2005 that claims priority from PCT/SE03/01362, filed 3 Sep. 2003.

FIELD OF THE INVENTION

The present invention relates to a method of treating a marine vehicle or object including a self-polishing antifouling paint or boat-bottom paint.

BACKGROUND AND SUMMARY OF THE INVENTION

Accordingly, the invention relates to an antifouling paint that includes a binder of relatively low mechanical strength so that the outer paint layer will be worn away by friction with the water and any organisms that have been able to fasten to the paint layer will be carried away with said layer.

With the intention of reducing the number of organisms that fasten to the surface of an antifouling paint when the boat is generally stationary in the water, it is known to make the layer of the paint applied slippery. Moreover, it is also known to add to the paint one or more additives for further reducing the tendency of the organisms to rest on or fasten to the exposed surface of the self-polishing paint. The biologically active substances that are acceptable from an environmental aspect and which have hitherto been used to control the tendency or ability of marine creatures from fastening to the surface of the self-polishing paint, particularly such creatures as molluscs, barnacles, and the like, have a troublesomely low effect. Although being effective, other substances, for instance metal compounds such as copper oxide or tin salts, or TBT, are generally unacceptable from an environmental aspect.

Accordingly, one object of the present invention is to provide a self-polishing paint which contains an environmentally acceptable substance that is effective in making it difficult for marine organisms, for example molluscs, barnacles, etc. from fastening to the water-exposed paint layer.

Another object of the invention is to provide a self-polishing paint, which also includes a substance that obstructs the process of photosynthesis in respect of algae that have fastened to the surface of the paint. These objects of the invention are achieved, either completely or partially, with a self-polishing antifouling paint.

Another problem is that large ships that require ballast cannot discharge the ballast water within 3 kilometers from a harbor without first cleaning it from alien species according to the new IMO regulation. This means ships must discharge the ballast water and then travel to the harbor without the ballast which makes the ships less stable. Many techniques have unsuccessfully been tried in the past to solve the problem concerning ballast water cleaning. For example, filtering systems have turned out to be ineffective and energy demanding.

The addition of chemicals to the ballast water is also unsatisfactory because the chemicals poison the water prior to discharge into the ocean. Ultraviolet light is also being used but poisonous bromide substances have a tendency to be formed. In view of the above, there is a need for an inexpensive and reliable system that permits ships to discharge ballast water at the harbor while conforming to rules and regulations such as those set out by the IMO.

The method of the present invention provides a solution to the above problems. More particularly, the method is for treating ballast water of a marine vessel. Ballast water is injected into a container of the marine vessel. The ballast water contains multi- and uni-cellular organisms. An organic substance is added to the ballast water so that heterotrophic organisms, such as aerobic and anaerobic bacteria, in the ballast water reproduce and consume the organic substance. In that process, the heterotrophic organisms substantially reduce the oxygen level in the ballast water compared to the oxygen level of untreated ballast water. The heterotrophic organisms consume virtually all the organic substance. Heterotrophic organisms and any other alien multi-cellular organisms die due to lack of oxygen and organic substance.

DETAILED DESCRIPTION

Figure 1:
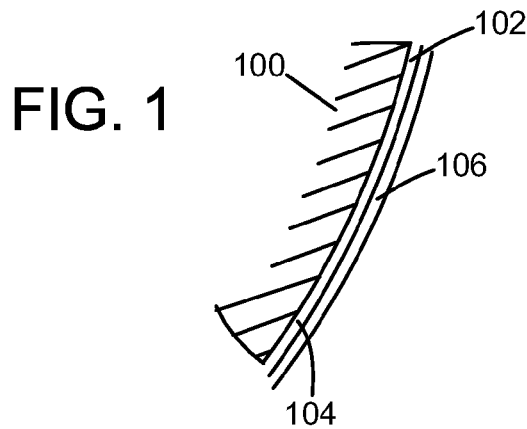
FIG. 1 is a cross-sectional front view of a marine vehicle that has the composition of the present invention applied thereon.
Figure 2:
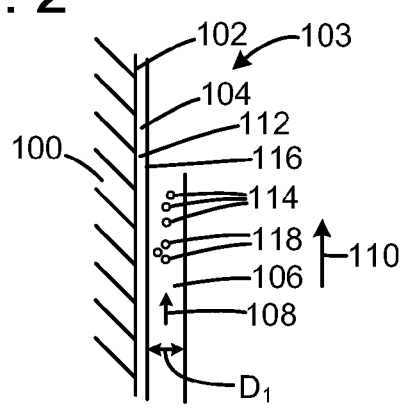
FIG. 2 is a cross-sectional top view of the marine vehicle moving at a first velocity.
Figure 3:
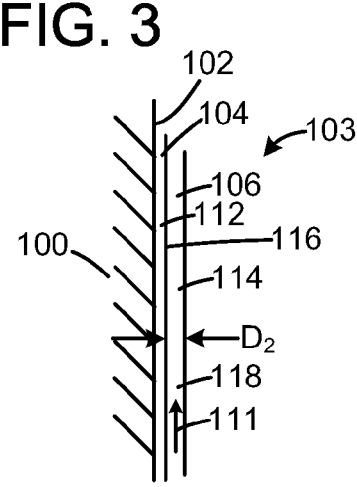
FIG. 3 is a cross-sectional top view of the marine vehicle moving at a second velocity faster than the first velocity.
Figure 4:
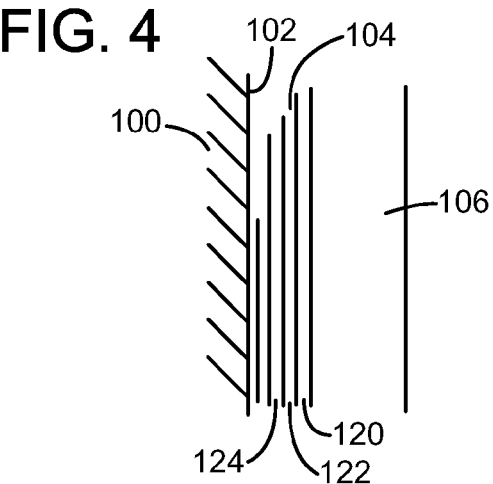
FIG. 4 is an enlarged cross-sectional top view of the marine vehicle showing the layers of the composition of the present invention.

The present invention is based on the insight that marine creatures, and particular mollusks, have a low tendency to fasten to a paint surface that has low oxygen content. The present invention is also based on the insight that the exposed outer paint layer can be given such a low oxygen content in an aqueous environment, by including in the paint a material which will decompose by bacterial activity in the presence of water while consuming oxygen from the surrounding layer of lake water/sea water. Because of its low oxygen content and possibly also because of the decomposition products from said bacterial activity, said water layer, which is thin and finds movement difficult by virtue of being received in pores and surface irregularities in the paint layer (particularly a porous outer layer of said self-polishing paint), results in a mollusk-unfriendly environment or milieu.

The material may be of a biological or chemical nature. In one preferred embodiment of the present invention, the material used is a biological material, preferably a material rich in protein, for example a vegetable material such as powdered soy. Said material, for instance the soy powder, will suitably have a particle size that lies in the range of 0.1-0.001 mm and will preferably be divided uniformly in the binder.

At least in some cases, the decomposition products of the material tend to provide an environment that is favorable to algae since they are able to provide an algae nutrient. It is therefore proposed in accordance with the invention that the inventive paint will also include a substance that obstructs the process of photosynthesis with respect to algae that fasten to the paint surface. Such photosynthesis inhibitors are well known in the art and have a relatively small environment loading effect when administered in effective dosages. Irgarol is a photosynthesis inhibitor that is compatible with self-polishing antifouling paints.

In operation, a marine object or vehicle 100 has a surface 102 that may be protected with the composition 104 of the present invention. The surface 102 has a boundary layer 106 in which water flows at a velocity 108 relative to the vehicle 100 that is lower than a velocity 110 of the water relative to the marine vehicle 100 outside the boundary layer 106.

In the preferred embodiment, the composition 104 may be used as paint on the surface 102 of the marine vehicle 100. The composition may include an organic substance 112 that is decomposable. The organic substance 112 should have a particle size in the range of 0.001-0.1 millimeters. If the particle size is greater than 0.1 millimeters the composition 104 creates undesirable friction between the surface 102 and the surrounding water 103. If the particle size is smaller than 0.001 millimeters then the particles have a tendency to form clusters and thus form larger particles. It is also important that the organic substance 112 is thoroughly and evenly dispersed on the surface 102 to prevent undesirable growth on the all parts of the surface 102. Even if the particles do not completely cover every part of the surface 102 the lower oxygen level in the boundary layer 106 reduces the risk of hard fouling. The different fouling processes are described below. Preferably, the gap between the particles should not exceed one millimeter.

Preferably, bacteria 116 consumes the organic substance 112 and during this process uses oxygen 114 disposed in the boundary layer 106 so that the oxygen level inside the boundary layer 106 is substantially lower than an oxygen level outside the boundary layer 106. The oxygen level inside the layer 106 may be reduced to an oxygen level that is only 1-2% of the oxygen level outside the layer 106 or in areas of surfaces that have not been treated by the composition 104 of the present invention. Preferably, the oxygen level is lowered by at least 90%, more preferably at least 95%, and most preferred by at least 98% compared to oxygen levels in untreated areas outside the boundary layer 106.

The organic substance may be any suitable organic material such as wheat gluten. It should be noted that it is not the organic substance 112 that creates the antifouling effect of the composition 104 i.e. less growth on the surface 102. The antifouling effect is created by bacteria 116, as described below. If the composition itself only includes bacteria the bacteria will eventually starve when they run out of organic substances.

The fouling effect may be divided into hard-body fouling (oxygen consuming) and light-body (photo-synthetic) fouling. Hard-body fouling may be created by muscles, oysters, worms and other such marine animals that require oxygen to live. Light-body fouling relies of the photo synthesis, by for example algae and grass, that may be negatively affected by the production of bacteria by-products such as metabolic substances. Light-body fouling is also a problem for hard-fouling since the photo synthesis process produces oxygen that sea animals need. The metabolic substances in the boundary layer 106 deter light-body fouling.

One important function of the organic substance 112 of the composition is to attract bacteria 116. The bacteria 116 consume the organic substance 112 as nourishment and during this consumption process the bacteria 116 consume oxygen 114 and create metabolites or metabolic substances 118, such as alcoholic, acid and yeast substances. The consumption process of the bacteria 116 thus drastically reduces the oxygen level in the boundary layer 106 to about 1-2% of the normal oxygen level, as indicated above.

Another important function of the surface 102 is to make the organic substance 112 available to the bacteria 116 over time. The composition 104 may include a release feature so that the composition 104 may provide sufficient organic substances of a long time such as 20 weeks. The composition 104 may be permitted to gradually erode so that layers that are deficient of organic substances fall off the surface 102. In the erosion step, the surface 102 may include a first layer 120 that falls off to expose a second underlying layer 122 that, after time, also falls off to expose a third underlying layer 124 and so on. Another option is to make the composition 104 very porous to increase the effective surface area to include organic substances that are available for consumption by the bacteria 116.

As the velocity of the marine vehicle increases, i.e. as the velocity 108 increases to the velocity 111, a thickness of the boundary layer is reduced from a thickness D1 to a smaller thickness D2. The thickness D1 may be about one millimeter. Although the thickness of the low oxygen content boundary layer is reduced as the velocity of the marine vehicle increase the risk of anything attaching to the surface 102 is also reduced at the velocity 111 compared to the low velocity 108 or when the marine vehicle 100 is at a stand still. It is important to take advantage of the lower velocity in the boundary layer 106 in order to reduce the oxygen level. If the velocity of the water immediately adjacent to the surface 102 is very high then the lowering of the oxygen level would be very temporary as new water with fresh oxygen constantly flows by.

EXAMPLE

There was prepared a paint composition corresponding to model paint composition A, although the copper oxide was excluded and replaced with dry soy meal with a grain size of 0.01 mm. The paint was applied in a surface layer. Such a model paint composition A may include 98 percent solid substance volume of tri-isopropyl silyl acrylate, 2 percent solid substance volume of hydrogen substance/Disperbyk 164 (for example Byk Chemie, Germany), 2 percent solid substance volume, silica Aerosil 200 (for example Degussa, Germany), 2 percent solid substance volume, modified polyethylene wax, Aditix M60 X (for example Supercolori, Italy), 36 percent solid substance volume of soy flour. Solid substance volume ratio: 50; solvent xylene.

The paint was applied as an antifouling paint on a boat lying in Baltic Sea water. Once exposed to the water environment, the soy flour particles went through a biological decomposition process as the outer layer of paint consumed oxygen from the adjacent layer of water. Mollusks were found to have a low tendency to fasten to the outer paint layer.

The soy flour decomposition products were found to enhance the growth of algae. A comparison paint of the same composition but without soy or any other copper oxide used and including 0.05% Irgarol (registered trademark) gave no effect with regard to the growth of mollusks but had a pronounced limitation on the growth of algae on the paint surface in contact with the water, as a result of its algaecidal effect.

The example shows that a self-polishing antifouling paint that contains a significant proportion of a material which decomposes in the presence of water while consuming oxygen from the adjacent layer of water limits the growth of mollusks on the paint and that the photosynthesis inhibitor included in the paint is able to control the increase in the growth of algae on the surface of the paint layer.

The amount of biologically active substance contained by the paint will correspond to the requisite oxygen consumption over the expected lifetime of the paint. The biologically active substance can be chosen from among chemical substances and biological substances that provide said oxygen consumption in the water layer present in the wet surface layer of the self-polishing paint, said surface layer being sponge-like and thereby significantly restricting the mobility of the contained water mass.

It is preferred in accordance with the invention to use a biological material which consumes oxygen when decomposing in a water environment. In addition to soy flour, there can be used fishmeal, egg powder, ground sea kelp and other similar material.

The biologically active material is incorporated in inventive antifouling paint compositions in an amount corresponding to 10-50 percent by weight, particularly with regard to the paint composition exemplified above in which dry soy flour was incorporated.

Figure 5:
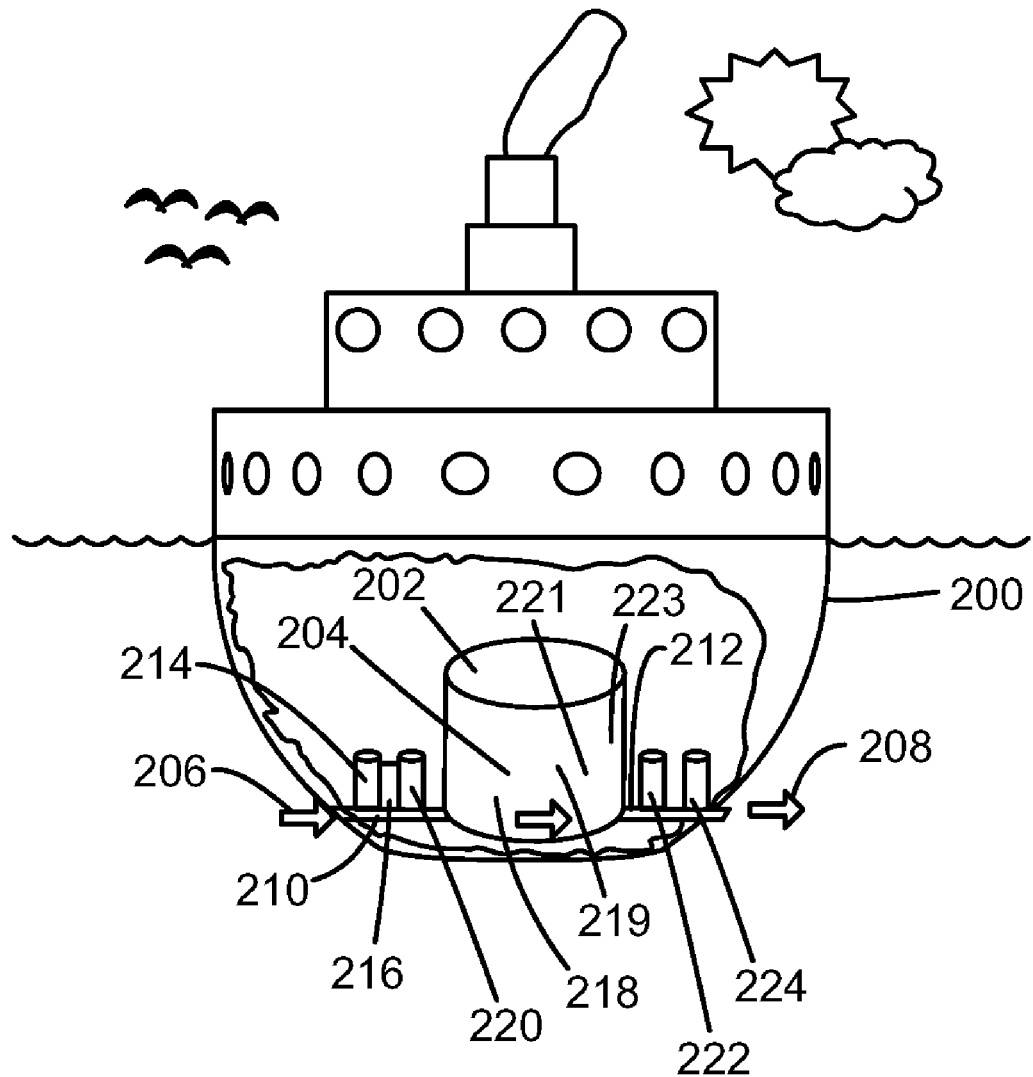
FIG. 5 is a schematic view of the method applied to the ballast water system of a marine vessel.

With reference to FIG. 5, a marine vessel 200 has a container 202 containing a liquid ballast 204 such as sea water. Discharge water from large ships is a particular problem if the ballast water is obtained in one part of the world and discharged into another part of the world since alien and undesirable multi-cellular organisms, such as oyster larva and jelly fish, and harmful micro-organisms with no natural enemies may be discharged into the new environment. It is to be understood that other liquids, such as cooling water, may also be cleaned using the method of the present invention and that the ballast water is only used as an illustrative example.

The process described in FIG. 5 is virtually identical to the processes described above in that one important function of the added organic substance, such as protein, sugar and other substances, is to attract and temporarily increase the number of heterotrophic organisms, such as aerobic and anaerobic bacteria, that consume the organic substance as nourishment, or consume each other, and during this consumption process, the heterotrophic organisms also consume virtually all of the oxygen in the ballast water. The depletion of oxygen is sped up by the large increase of the number of heterotrophic organisms that in turn is the result of the addition of the organic substance such as protein. The addition of other substances such as nitrogen and carbohydrates, such as sugar, increase the number of heterotrophic organisms and function like an accelerator. As the oxygen level is depleted in the ballast water, the aerobic organisms die. The lack of oxygen also kills any alien multi-cellular organisms that may exist in the ballast water.

More particularly, the marine vessel 200 has an inlet 206 and an outlet 208 defined therein so that ballast water 204 may flow into and out of the container 202 via conduits 210 and 212, respectively. At the inlet 206, there is a filter 214 for filtering away relatively large objects such as plants and animals. The filter 214 may be divided into a coarse filter, for filtering very large particles and animals, and a fine filter for filtering smaller particles and thus preventing the particles from entering the container 202.

Downstream of the filter 214 there is a dispensing apparatus 216 for supplying an organic substance 218, such as soy-protein, wheat-gluten or any other suitable organic substance, to the inflowing ballast water 204. The extra nourishment provided by the organic substance increases the number of oxygen consuming heterotrophic organisms 219. The increased number of heterotrophic organisms consumes the organic substance and during this process also consumes the oxygen in the water. As the oxygen concentration decreases in the water, the aerobic bacteria 219 die. This means any other alien multi-cellular organisms 221 die also due to the lack of oxygen in the ballast water. Anaerobic bacteria 223 may still exist in the water though since they are not dependent upon the oxygen level in the ballast water. The anaerobic bacteria 223 may even continue multiplying as long as there is nourishment such as the previously added organic substances available in the ballast water.

The dispensing apparatus 216 may be any suitable dosing device or dispensing/dissolving apparatus that supplies organic substances and other substances as needed. It may also be possible to manually supply the organic substance 218 without using the apparatus 216. It has surprisingly been discovered that as little as 0.04 gram of organic substance, such as protein, per liter ballast water is sufficient to basically remove all oxygen in the ballast water within 24-48 hours due to the dramatic increase of the heterotrophic organisms.

Preferably, the conduits also have pumps 220, 222 on each side of the container 202 to increase the flow of the ballast water in the conduits 210, 212. Downstream of pump 222, the conduit 212 may have an ultra-violet (UV) light emitter 224 that terminates or eliminates any surviving anaerobic and aerobic organisms, micro-organisms, bacteria and spores and other such organisms that may still exist in the ballast 204 before the ballast exits the outlet 208 and into the ocean. It may also be possible to restore the oxygen level of the oxygen deficient ballast, such as anoxic/hypoxic discharge water, prior to the discharge to avoid harmful effects to organisms and nature after discharge back into the ocean.

Ideally, during for example a 5 day voyage, the first 2 days the heterotrophic organisms may consume virtually all of the oxygen in the ballast water. The remaining 3 days there is no oxygen available so that the aerobic bacteria and other alien multi-cellular organisms eventually die from oxygen depletion. Ideally, the anaerobic bacteria should run out of the organic substance after about 2 days also so that they die from nourishment depletion.

If an insufficient amount of organic substance is added to the ballast water, the heterotrophic organisms are not sufficiently reproducing to consume the oxygen or it may take too long for the oxygen level to be reduced to eventually kill off the aerobic bacteria and other alien multi-cell organisms.

If the organic substances are over-dozed into the ballast water, the discharged water may contain an unnecessarily large amount of the organic substances and anaerobic bacterias. When the correct amount of organic substance is added, not only does the aerobic bacteria die due to lack of oxygen but the anaerobic bacteria die also due to lack of organic substances in the ballast water.

Figure 6A:
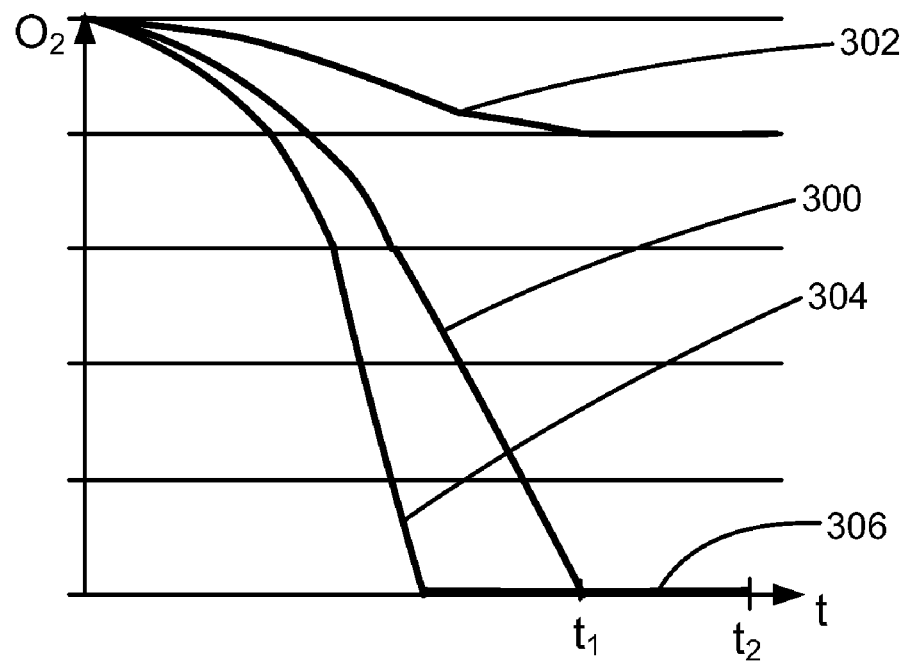
FIG. 6a is a graphical view of the effect of the oxygen concentration in the ballast water over time by using the method of the present invention.

FIG. 6a illustrates how the oxygen level depends upon the concentration of the organic substance. The solid line 300 shows a suitable concentration of organic substance added. The oxygen level should remain close to zero for a time period 306 that starts at time t1. The alien multi-cellular organisms and aerobic bacteria die shortly thereafter as indicated by time t2 due to oxygen depletion. The very low oxygen level during the time period 306, i.e. from time t1 to time t2, is an indication that there has been a high biological activity which has consumed the dissolved oxygen in the water. Line 302 indicates the oxygen level when an insufficient amount of organic substances have been added and line 304 when the organic substances have been over-dozed.

Figure 6B:
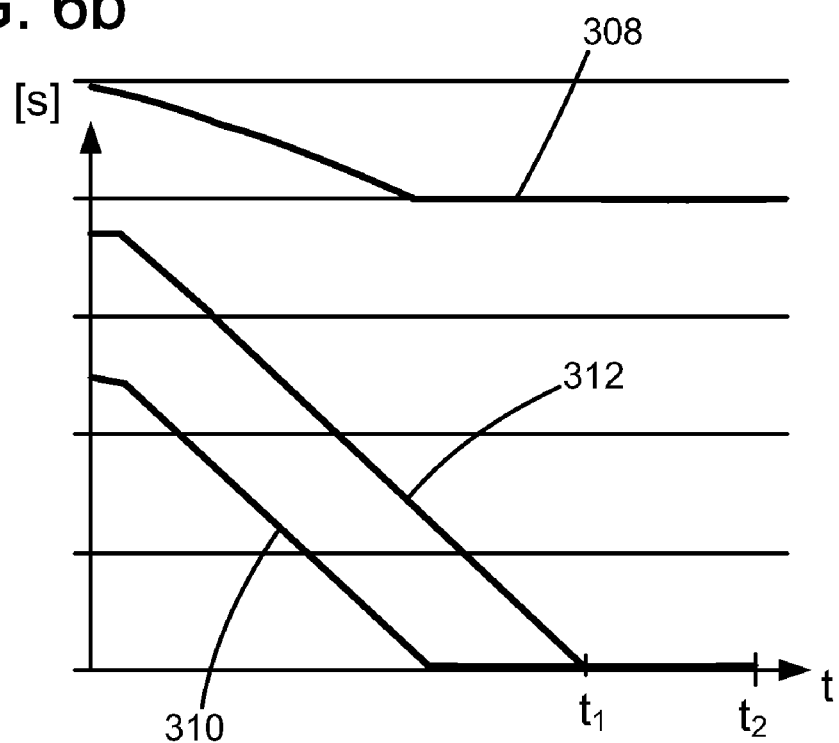
FIG. 6b is a graphical view of the effect on the substance level in the ballast water over time by using the method of the present invention.

FIG. 6b illustrates the protein level over time in the ballast water. Line 310 indicates when an insufficient amount of protein has been added so that all the protein is consumed too quickly. Line 308 indicated when too much protein has been added so that all of the protein is never consumed during a voyage. Line 312 shows when an ideal amount of protein has been added so that the heterotrophic organisms run out of protein at time t1 so that all the living organisms die at time t2.

While the present invention has been described in accordance with preferred compositions and embodiments, it is to be understood that certain substitutions and alterations may be made thereto without departing from the spirit and scope of the following claims.

We claim:

1. A method of eliminating living organisms from ballast water of a marine vessel, comprising:
   injecting ballast water into a container;
   adding an organic substance into the ballast water; heterotrophic organisms, already disposed in the ballast water, reproducing and consuming the organic substance,
   the heterotrophic organisms reproducing as a result of the consumed organic substance to increase in numbers compared to before the addition of the organic substance;
   the increased number of heterotrophic organisms substantially reducing an oxygen concentration in the ballast water compared to the oxygen concentration of untreated ballast water;
   adding an amount of organic substance to the ballast water so that the oxygen is consumed by the heterotrophic organisms when anaerobic organisms already disposed in the ballast water run out of the organic substance;
   the anaerobic organisms in the ballast water dying due to an absence of the organic substance in the ballast water; and
   aerobic organisms in the ballast water dying due to an absence of vital oxygen in the ballast water.

2. The method according to claim 1 wherein the method further comprises eliminating heterotrophic organisms from the ballast water by adjusting an amount of organic substance added to the ballast water so that the oxygen and the organic substance are simultaneously depleted at a time (t1).

3. The method according to claim 1 wherein the method further comprises filtering away organisms in a filter.

4. The method according to claim 1 wherein the method further comprises using a dispensing apparatus for dispensing the organic substance in the ballast water.

5. The method according to claim 1 wherein the method further comprises dispensing soy-protein into the ballast water.

6. The method according to claim 1 wherein the method further comprises exposing the ballast water to UV light prior to discharge from the container to kill heterotrophic organisms.

7. The method according to claim 1 wherein the method further comprises restoring the oxygen level in the ballast water prior to discharging the ballast water from the container.

* * * * *